United States Patent Office 3,102,870
Patented Sept. 3, 1963

3,102,870
HEXA-SUBSTITUTED BENZENES AS RESIN STABILIZERS
Kenneth R. Mills, Boris Franzus, and Peter J. Canterino, Bartlesville, Okla., assignors to Phillips Petroleum Company, a corporation of Delaware
No Drawing. Filed Oct. 2, 1959, Ser. No. 843,919
20 Claims. (Cl. 260—45.7)

This invention relates to hexa-substituted benzenes as resin stabilizers.

Many of the polymers used in the plastics industry exhibit insufficient inherent stability when exposed to light. Ultraviolet light is particularly troublesome. The resins become brittle, show loss in tensile strength, and their surfaces become chalky, in extreme cases showing checking or cracking.

The following are objects of our invention.

An object of our invention is to provide new compositions comprising an ultraviolet sensitive polymer and a small quantity of a hydrocarbon hexa-substituted benzene. A further object of our invention is to improve the resistance of olefin polymers, such as polyethylene, to ultraviolet light.

Other objects and advantages of this invention will be apparent to one skilled in the art upon reading the accompanying disclosure.

Broadly, our invention resides in the production of new compositions comprising an ultraviolet sensitive polymer and a small quantity of a hydrocarbon hexa-substituted benzene.

We have now found that by incorporation of a small quantity, say from 0.1 to 10 parts by weight of a hexa-substituted benzene in 100 parts of a polyolefin resin, deterioration from the effects of exposure to ultraviolet light is inhibited over extended periods of time. The amounts given are by way of example. Generally the improvement is proportional to the amount of additive used.

The hexa-substituted benzenes used in the present invention are compounds having the general formula

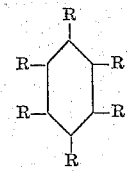

in which R represents an alkyl, cycloalkyl, aryl, aralkyl, or alkaryl group, the R's being the same or different. These hexa-substituted benzenes may be prepared by any suitable method. A convenient method for the production of hexa-substituted benzenes in which all substituents are identical comprises trimerization of symmetrical disubstituted acetylenes using catalyst systems comprising a metal hydride or organometal compound of a metal of groups I, II, or III of the periodic system, including compounds wherein one or more but not all the organic groups are replaced by halogen, together with a salt or alcoholate of a metal of group IV, V, VI, or VIII, these components being present in a mole ratio between 0.5:1 and 5.0:1.

This is the method disclosed by Franzus et al. in application Serial No. 763,831, filed September 29, 1958, now abandoned, wherein the catalyst system is more specifically disclosed as comprising (A) metal hydrides or organometal compounds of metals of groups I, II, and III of the periodic system, including compounds wherein one or more but not all the organic groups are replaced by halogen, together with (B) a chloride, bromide, iodide, oxychloride, oxybromide, oxyiodide, or alcoholate of trivalent iron, trivalent cobalt, trivalent nickel, tetravalent titanium, tetravalent zirconium, tetravalent hafnium, tetravalent thorium, tetravalent germanium, tetravalent tin, tetravalent lead, tetravalent platinum, tetravalent osmium, tetravalent iridium, pentavalent vanadium, pentavalent niobium, pentavalent molybdenum, pentavalent tungsten, pentavalent uranium, and hexavalent chromium. It is preferred that these components be present in a mole ratio of (A) to (B) of at least 0.5:1 and more preferably at least 1:1.

Suitable hydrocarbon hexa-substituted benzenes include hexa-phenylbenzene, hexa-1-naphthylbenzene, hexa-2-naphthylbenzene, hexa-methylbenzene, hexa-ethylbenzene, hexa-dodecylbenzene, hexa-cyclohexylbenzene, hexa-cyclopentylbenzene, hexa-benzylbenzene, hexa-p-tolylbenzene, hexa-(3-ethylphenyl)benzene, 1,4-diethyl-2,3,5,6-tetramethylbenzene, 1,2-diphenyl-3,4,5,6-tetraethylbenzene, 2,3,4,5,6-pentaphenyltoluene, 1,4-dinaphthyl-2,3,5,6-tetraphenylbenzene, 1,4-dimethyl-2,3-diphenyl-5,6-diethylbenzene, 1,2,3-triphenyl-4,5,6-trimethylbenzene, 1,2-dibenzyl-3,4-dimethyl-5,6-diphenylbenzene, hexa-(2-phenylethyl)benzene, hexa-tert-butylbenzene and hexa-isopropylbenzene.

The preferred hexa-substituted benzenes are those in which all substituents are identical, and still more preferable are the hexa-phenylbenzenes in which, referring to the general formula above, R is a phenyl or substituted phenyl or naphthyl group. They can contain as many as 60 carbon atoms in the sum of the substituent groups.

The additives of the present invention have a high degree of compatibility with the polyolefin in which they are incorporated. A convenient method for their incorporation is by addition on a roll mill operated at a temperature in the range between 275 and 400° F.

The resins in which the stabilizers of our invention are used include, broadly, those which are sensitive to ultraviolet light. These include, for example, polyethylene, polypropylene, ethylene-propylene copolymers, poly(vinylchloride), poly(vinyl acetate), vinyl chloride-vinyl acetate copolymers, and poly(vinylidene chloride). The stabilizer can be used alone or together with other additives such as fillers, antioxidants, pigments, etc. Mixtures of stabilizers can be used.

The following example illustrates a specific embodiment of our invention. The polyethylene was prepared according to this method of Hogan and Banks 2,825,721 and had a density of 0.960±0.001, a melt index of 0.9±0.1, and a crystallinity of approximately 94%.

EXAMPLE

A series of runs was made in which hexa-phenylbenzene was incorporated in polyethylene on a roll mill at 300° F., using a milling period of 10 minutes, in amounts varying from 0.5 to 6.0 percent and tested in a weatherometer (Atlas WeatherOmeter), by which an accelerated ultraviolet treatment was provided. In these runs, the polymer containing the additive was compression molded to form a slab from which tensile bars were cut. A number of these bars were exposed and removed individually over a period of time for tensile determination. The values obtained were distributed on a graph and the hours' exposure to a drop in tensile of 50 percent determined as the evaluation for the sample. Data from these tests are shown below:

Table I

| Amount hexa-phenylbenzene percent | Time to 50% tensile (hours) |
|---|---|
| None | 120 |
| 0.5 | 300 |
| 1.0 | 375 |
| 6.0 | 600 |

In all the above tests, the additive appeared to be completely compatible, as indicated by absence of bleeding.

As many possible embodiments can be made of this invention without departing from the scope thereof, it is to be understood that all matter herein set forth is to be interpreted as illustrative and not as unduly limiting the invention.

We claim:

1. An ultraviolet sensitive polymer selected from the group consisting of homopolymers of ethylene, propylene, vinyl chloride, vinyl acetate, vinylidene chloride, and copolymers of these monomers and a stabilizing amount of a hexaaryl-substituted benzene.
2. An ultraviolet sensitive polymer selected from the group consisting of homopolymers of ethylene, propylene, vinyl chloride, vinyl acetate, vinylidene chloride, and copolymers of these monomers containing, per 100 parts by weight, 0.1 to 10 parts of a hexa-aryl-substituted benzene.
3. Polyethylene containing a stabilizing amount of a hexa-arylsubstituted benzene.
4. Polyethylene containing, per 100 parts by weight, 0.1 to 10 parts of a hexa-aryl-substituted benzene.
5. Polyethylene containing, per 100 parts by weight, 0.1 to 10 parts of hexa-phenylbenzene.
6. Polyethylene containing, per 100 parts by weight, 0.5 to 6 parts of hexa-phenylbenzene.
7. An ultraviolet sensitive polymer selected from the group consisting of homopolymers of ethylene, propylene, vinyl chloride, vinyl acetate, vinylidene chloride, and copolymers of these monomers and a stabilizing amount of hexa-phenylbenzene.
8. Polypropylene containing a stabilizing amount of a hexa-aryl-substituted benzene.
9. An ethylene-propylene copolymer containing a stabilizing amount of a hexa-aryl-substituted benzene.
10. Poly(vinyl chloride) containing a stabilizing amount of a hexa-aryl-substituted benzene.
11. Poly(vinyl acetate) containing a stabilizing amount of a hexa-aryl-substituted benzene.
12. A vinyl chloride-vinyl acetate copolymer containing a stabilizing amount of a hexa-aryl-substituted benzene.
13. Poly(vinylidene chloride) containing a stabilizing amount of a hexa-aryl-substituted benzene.
14. Polypropylene containing a stabilizing amount of hexa-phenylbenzene.
15. An ethylene-propylene copolymer containing a stabilizing amount of hexa-phenylbenzene.
16. Poly(vinyl chloride) containing a stabilizing amount of hexa-phenylbenzene.
17. Poly(vinyl acetate) containing a stabilizing amount of hexa-phenylbenzene.
18. A vinyl chloride-vinyl acetate copolymer containing a stabilizing amount of hexa-phenylbenzene.
19. Poly(vinylidene chloride) containing a stabilizing amount of hexa-phenylbenzene.
20. Polyethylene containing a stabilizing amount of hexa-phenylbenzene.

References Cited in the file of this patent

UNITED STATES PATENTS

| | | |
|---|---|---|
| 2,854,489 | Dereich et al. | Sept. 30, 1958 |
| 2,900,361 | Havens | Aug. 18, 1959 |
| 2,917,479 | Raamsdonk et al. | Dec. 15, 1959 |
| 2,919,259 | Naylor et al. | Dec. 29, 1959 |
| 2,922,777 | Burgert et al. | Jan. 26, 1960 |
| 2,925,401 | Newland et al. | Feb. 16, 1960 |

OTHER REFERENCES

Nakamoto: 74 Journal Amer. Chem. Soc. 390 (1952), page 391.